(12) United States Patent
Morita et al.

(10) Patent No.: US 12,246,716 B2
(45) Date of Patent: Mar. 11, 2025

(54) CONTROL DEVICE OF VEHICLE, CONTROL METHOD, AND STORAGE MEDIUM

(71) Applicant: TOYOTA JIDOSHA KABUSHIKI KAISHA, Toyota (JP)

(72) Inventors: Yusuke Morita, Mishima (JP); Kuniaki Goto, Susono (JP); Satoshi Takeyasu, Saitama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 268 days.

(21) Appl. No.: 17/967,422

(22) Filed: Oct. 17, 2022

(65) Prior Publication Data

US 2023/0130037 A1 Apr. 27, 2023

(30) Foreign Application Priority Data

Oct. 21, 2021 (JP) .................. 2021-172602

(51) Int. Cl.
  *B60W 30/16* (2020.01)
  *B60W 30/09* (2012.01)
  (Continued)

(52) U.S. Cl.
  CPC ............ *B60W 30/16* (2013.01); *B60W 30/09* (2013.01); *B60W 30/0953* (2013.01);
  (Continued)

(58) Field of Classification Search
  None
  See application file for complete search history.

(56) References Cited

U.S. PATENT DOCUMENTS

2013/0173132 A1* 7/2013 Yuasa ............... B60W 30/0956
  701/70
2013/0311077 A1* 11/2013 Ichida .................... G08G 1/165
  701/300

(Continued)

FOREIGN PATENT DOCUMENTS

| JP | H08-212499 A | 8/1996 |
| JP | 2010143551 A | * 7/2010 |
| JP | 2021-009595 A | 1/2021 |

OTHER PUBLICATIONS

Machine translation of JP-2010143551-A (Year: 2024).*

*Primary Examiner* — Aniss Chad
*Assistant Examiner* — Jennifer M Anda
(74) *Attorney, Agent, or Firm* — Dinsmore & Shohl LLP (57) ABSTRACT

The control device according to the present disclosure executes a process of acquiring an image captured by a camera provided in a vehicle and estimating an vehicle-to-vehicle distance and a relative speed with the preceding vehicle based on an image, a process of calculating a time to collision with respect to the preceding vehicle from the vehicle-to-vehicle distance and the relative speed, a deceleration process of decelerating the vehicle based on the vehicle-to-vehicle distance, the relative speed, and the time to collision, and a process of performing a warning to the driver of the vehicle upon receiving that the amplitude of the variation of any one physical quantity of the vehicle-to-vehicle distance, the relative speed, or the time to collision has become equal to or greater than a predetermined threshold value.

5 Claims, 6 Drawing Sheets

(51) Int. Cl.
*B60W 30/095* (2012.01)
*B60W 50/14* (2020.01)
(52) U.S. Cl.
CPC ........ *B60W 30/0956* (2013.01); *B60W 50/14* (2013.01); *B60W 2420/403* (2013.01); *B60W 2554/80* (2020.02)

(56) References Cited

U.S. PATENT DOCUMENTS

| | | | | |
|---|---|---|---|---|
| 2015/0175162 | A1* | 6/2015 | Nakadori | B60W 30/16 701/96 |
| 2018/0151073 | A1* | 5/2018 | Minemura | G08G 1/166 |
| 2018/0218228 | A1* | 8/2018 | Takaki | G06V 20/58 |
| 2022/0314989 | A1* | 10/2022 | Nagaoka | B60W 60/0053 |

* cited by examiner

CONTROL DEVICE OF VEHICLE, CONTROL METHOD, AND STORAGE MEDIUM

CROSS-REFERENCE TO RELATED APPLICATION

This application claims priority to Japanese Patent Application No. 2021-172602 filed on Oct. 21, 2021, incorporated herein by reference in its entirety.

BACKGROUND

1. Technical Field

The present disclosure relates to a control device that controls traveling of a vehicle, a control method, and a storage medium that stores a program that causes a computer to execute the control method.

2. Description of Related Art

Conventionally, a technique for detecting a preceding vehicle by utilizing a sensor provided in a vehicle to perform driving assistance and traveling control for the preceding vehicle is known. For example, Japanese Unexamined Patent Application Publication No. 08-212499 (JP 08-212499 A) discloses a technology of detecting a traveling state of a preceding vehicle by performing a recognition processing by brightness or the like by extracting a specific color portion in an image data, and setting a distance range between the vehicle and the preceding vehicle in which an alarm is required based on the traveling state of the preceding vehicle. In addition, Japanese Unexamined Patent Application Publication No. 2021-009595 (JP 2021-009595 A) is cited as a conventional technique for performing driving assistance and a traveling control for a preceding vehicle.

SUMMARY

As a traveling control for a preceding vehicle, there is a deceleration process for decelerating a vehicle according to a position of the preceding vehicle. Here, in the execution of the deceleration process, one of sensors for detecting the preceding vehicle is a camera for capturing the front of the vehicle is cited. In particular, when the preceding vehicle is located at a distance and is outside a detection range of another sensor such as a millimeter-wave radar, the deceleration process is performed based on a vehicle-to-vehicle distance and a relative speed with respect to the preceding vehicle estimated from the image captured by the camera, and a time to collision (TTC) calculated from the vehicle-to-vehicle distance and relative speed.

However, the inventors of the present disclosure have confirmed that, when the preceding vehicle turns on a hazard lamp, there is a possibility that the estimated vehicle-to-vehicle distance and relative speed and the TTC calculated from them varies greatly according to the timing of the hazard lamp being turned on. In particular, it has been confirmed that this variation occurs remarkably in a dark environment such as at night. When the deceleration processing is executed as it is in such a state, there is a possibility that the determination of the control is erroneous and the safety is impaired.

The present disclosure has been made in view of the above-described problem. An object of the present disclosure is to disclose a control device of a vehicle that is able to ensure safety when executing a deceleration process for a preceding vehicle that turns on a hazard lamp, a control method, and storage medium that stores a program for causing a computer to execute the control method.

The first disclosure relates to a control device for controlling traveling of a vehicle. A control device according to the first disclosure executes: a process of acquiring an image captured by a camera provided in the vehicle and estimating a vehicle-to-vehicle distance and a relative speed with respect to a preceding vehicle based on the image; a process of calculating a time to collision with respect to the preceding vehicle from the vehicle-to-vehicle distance and the relative speed; a deceleration process of decelerating the vehicle based on the vehicle-to-vehicle distance, the relative speed, and the time to collision; and a process of warning a driver of the vehicle when a fluctuation width of a variation of a physical quantity of any one of the vehicle-to-vehicle distance, the relative speed, and the time to collision becomes equal to or greater than a predetermined threshold value.

The second disclosure relates to the control device further having the following characteristics with respect to the control device according to the first disclosure. The control device is configured so as to be configured so as not to execute the deceleration process while the fluctuation width of the variation of the physical quantity of any one of the vehicle-to-vehicle distance, the relative speed, and the time to collision is equal to or greater than the threshold value.

A third disclosure relates to the control device further having the following characteristics with respect to the control device according to the second disclosure. The control device is configured to execute the deceleration process with a direct current bias of a periodic variation set as a representative value of the physical quantity of any one of the vehicle-to-vehicle distance, the relative speed, and the time to collision, even when the fluctuation width of the variation of the physical quantity of any one of the vehicle-to-vehicle distance, the relative speed, and the time to collision is equal to or greater than the threshold value, when the fluctuation width varies periodically.

The fourth disclosure relates to a control device that controls traveling of a vehicle. The control device according to the fourth disclosure is configured to execute: a process of acquiring an image captured by a camera provided in the vehicle and estimating a vehicle-to-vehicle distance and a relative speed with respect to a preceding vehicle based on the image; a process of calculating a time to collision with respect to the preceding vehicle from the vehicle-to-vehicle distance and the relative speed; and a deceleration process of decelerating the vehicle based on the vehicle-to-vehicle distance, the relative speed, and the time to collision, in which the control device is configured to execute the deceleration process with a direct current bias of a periodic variation set as a representative value of a physical quantity of any one of the vehicle-to-vehicle distance, the relative speed, and the time to collision when the physical quantity of any one of the vehicle-to-vehicle distance, the relative speed, and the time to collision varies periodically.

The fifth disclosure relates to a control method that controls traveling of a vehicle. The control method according to the fifth disclosure includes: acquiring an image captured by a camera provided in the vehicle and estimating a vehicle-to-vehicle distance and a relative speed with respect to a preceding vehicle based on the image; calculating a time to collision with respect to the preceding vehicle from the vehicle-to-vehicle distance and the relative speed; executing a deceleration process of decelerating the vehicle based on the vehicle-to-vehicle distance, the relative speed, and the time to collision; and warning a driver of the vehicle when a fluctuation width of a variation of a physical quantity of any one of the vehicle-to-vehicle distance, the relative speed, and the time to collision becomes equal to or greater than a predetermined threshold value.

The sixth disclosure relates to a control method that controls traveling of a vehicle. The control method according to the sixth disclosure includes: acquiring an image captured by a camera provided in the vehicle and estimating a vehicle-to-vehicle distance and a relative speed with respect to a preceding vehicle based on the image; calculating a time to collision with respect to the preceding vehicle from the vehicle-to-vehicle distance and the relative speed; and executing a deceleration process of decelerating the vehicle based on the vehicle-to-vehicle distance, the relative speed, and the time to collision, in which the control method executes the deceleration process with a direct current bias of a periodic variation set as a representative value of a physical quantity of any one of the vehicle-to-vehicle distance, the relative speed, and the time to collision when the physical quantity of any one of the vehicle-to-vehicle distance, the relative speed, and the time to collision varies periodically.

A seventh disclosure relates to a storage medium that stores a program that causes a computer to execute the control method according to the fifth disclosure.

With the control device, the control method, and the storage medium that stores the program that causes the computer to execute the control method according to the present disclosure, warning a driver of the vehicle is performed when a fluctuation width of a variation of a physical quantity of any one of the vehicle-to-vehicle distance, the relative speed, and the time to collision becomes equal to or more than a predetermined threshold value. Thus, it is possible to prompt the driver to perform active drive operation when the physical quantity of any one of the vehicle-to-vehicle distance, the relative speed, or the time to collision is varied greatly and there is a possibility that safety is impaired.

Further, with the control device, the control method, and the storage medium that stores the program that causes the computer to execute the control method according to the present disclosure, the deceleration process is executed with a direct current bias of the periodic variation set as a representative value of the physical quantity of any one of the vehicle-to-vehicle distance, the relative speed, and the time to collision when the physical quantity of any one of the vehicle-to-vehicle distance, the relative speed, and the TTC varies periodically. Thus, it is possible to perform the deceleration process by reducing the influence of fluctuation when the physical quantity of any one of the vehicle-to-vehicle distance, the relative speed, or the TTC is periodically varied.

As a result, safety can be ensured when the deceleration process is executed for the preceding vehicle in which the hazard lamp is turned on.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described with reference to the drawings. However, when the number, quantity, amount, range, etc. of each element are referred to in the embodiments shown below, the idea of the present disclosure is not limited to the numbers mentioned herein except when explicitly stated or when clearly specified by the number in principle. In addition, the configurations and the like described in the embodiments shown below are not necessary to the idea of the present disclosure, except when explicitly stated or when clearly specified in principle. In each figure, the same or corresponding parts are designated by the same reference signs, and duplicated description thereof will be appropriately simplified or omitted.

1. Outline

The control device according to the present embodiment executes a deceleration process for decelerating the vehicle in accordance with the position of the preceding vehicle. The deceleration process is typically performed for the purpose of maintaining the vehicle-to-vehicle distance with the preceding vehicle and driving assistance for collision avoidance against the preceding vehicle in stop. The vehicle on which the deceleration process is performed may be an automatic driving vehicle. In this case, the deceleration process is performed as one of the functions in the automatic operation.

The control device according to the present embodiment, when the execution of the deceleration process, acquires an image to be captured by the camera provided in the vehicle, estimates the vehicle-to-vehicle distance and relative speed to the preceding vehicle from the image. The time to collision (TTC) is calculated from estimated vehicle-to-vehicle distances and relative speeds.

Figure 1A:
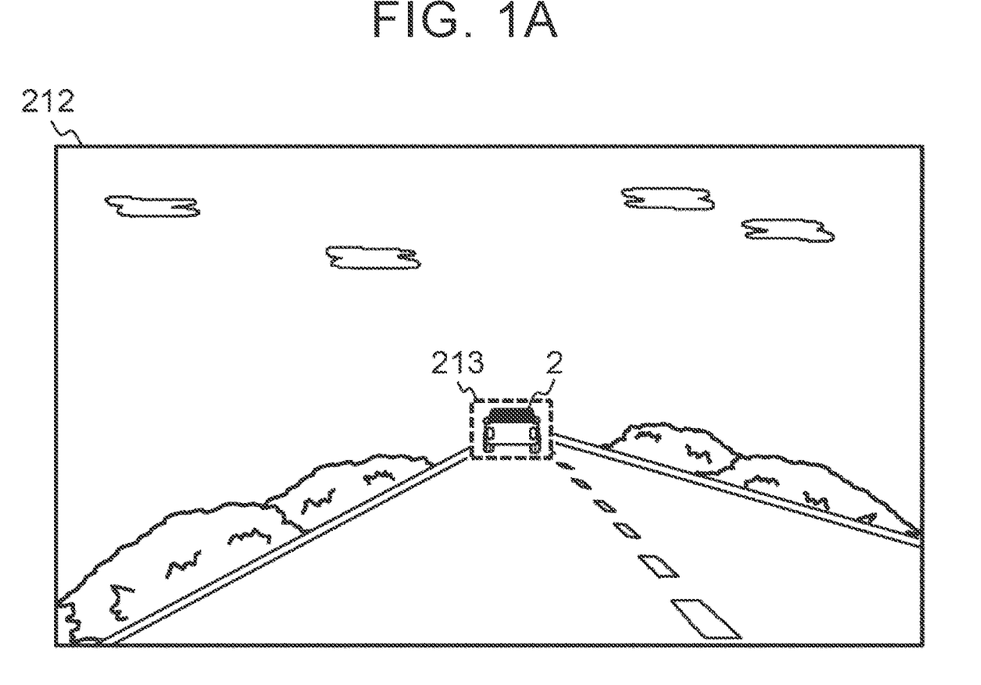
FIG. 1A is a conceptual diagram showing an example of an image that a control device acquires in order to estimate a vehicle-to-vehicle distance, a relative speed, and TTC with a preceding vehicle.
Figure 1B:
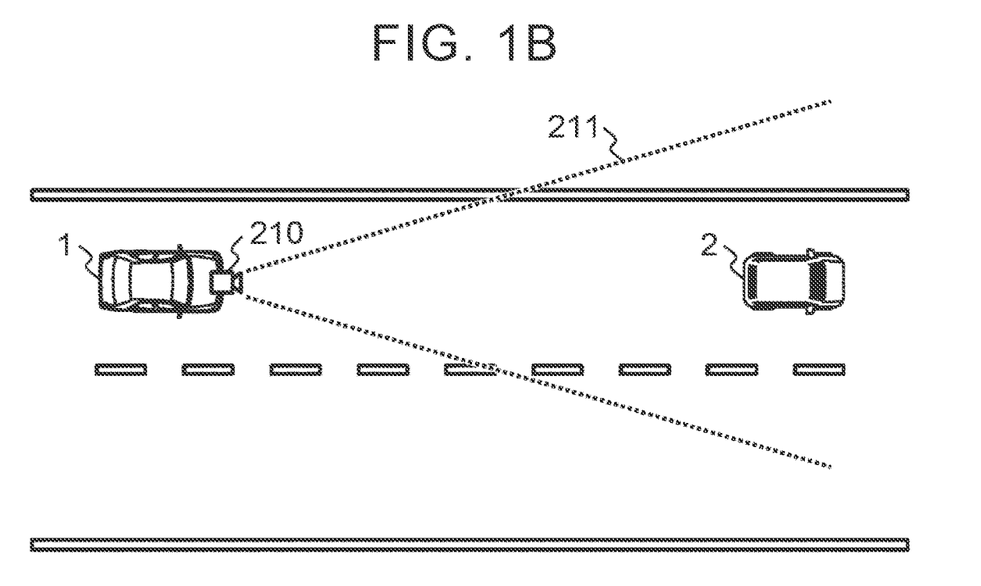
FIG. 1B is a conceptual diagram showing an example of an image that a control device acquires in order to estimate a vehicle-to-vehicle distance, a relative speed, and TTC with a preceding vehicle.

FIG. 1A and FIG. 1B are a conceptual diagrams illustrating an example of an image 212 that is acquired by the control device in order to estimate the vehicle-to-vehicle distance and relative speed with the preceding vehicle 2 when the deceleration process is executed. FIG. 1B shows a situation in which the image 212 shown in FIG. 1A is captured. In FIG. 1A and FIG. 1B, the camera 210 provided in the vehicle 1 is an imaging area 211 in front of the vehicle 1, the image 212 is imaged by the camera 210.

The control device can detect the preceding vehicle 2 by recognizing that the preceding vehicle 2 appears in the image 212. Also, the vehicle-to-vehicle distance and relative speed with the preceding vehicle 2 are typically estimated by recognizing changes in the size and size of the area 213 of the preceding vehicle 2 appearing in the image 212. That is, the larger the size of the area 213, the shorter the vehicle-to-vehicle distance is estimated, the larger the change in the size of the area 213, the larger the absolute value of the relative speed is estimated.

However, in the case where the surroundings of the night or the like is a dark environment and the preceding vehicle 2 is present at a distance or the like, it becomes difficult to recognize the change in the size and size of the area 213 of the preceding vehicle 2 appearing in the image 212 due to the lighting of the hazard lamp. Therefore, the vehicle-to-vehicle distance and relative speed estimated from the image 212 and TTC calculated from them may vary greatly periodically according to the timing of lighting of the hazard lamp.

Figure 2:
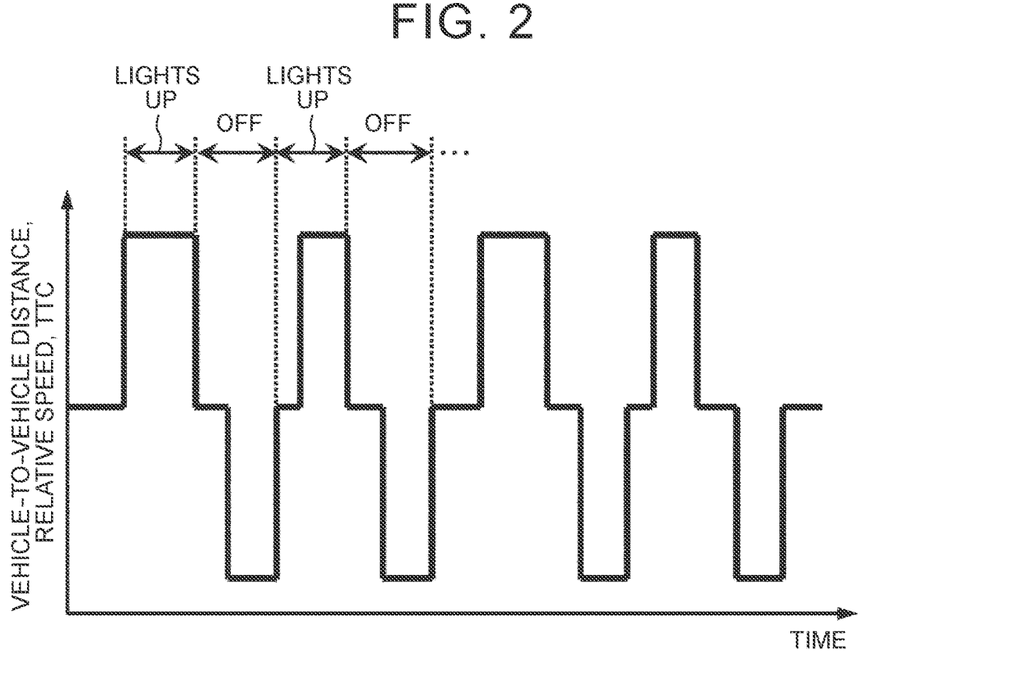
FIG. 2 is a conceptual diagram for explaining the estimated vehicle-to-vehicle distance, the relative speed, and the TTC when the preceding vehicle is lighting a hazard lamp.

FIG. 2 shows an example of the estimated vehicle-to-vehicle distance and relative speed when the preceding vehicle 2 is lighting the hazard lamp and TTC calculated from them. Here, the vertical axis represents the vehicle-to-vehicle distance, relative speed, or the magnitude of any one physical quantity of TTC, the horizontal axis represents time.

Even when the preceding vehicle 2 is located at a distance and is outside the detection range of other sensors such as a millimeter-wave radar, it is desirable that the deceleration process for the preceding vehicle 2 is executed in order to improve the control performance and improve the safety. In this case, the deceleration process is executed based on the vehicle-to-vehicle distance and relative speed with the preceding vehicle 2 estimated from the image 212 and the TTC calculated from them. However, if the deceleration process is executed as it is in a state where the vehicle-to-vehicle distance, relative speed, or TTC estimated from the image 212 greatly fluctuates, the determination of the control may be erroneous, and the safety may be impaired.

Therefore, the control device according to the present embodiment is configured to execute a process of giving a warning to the driver in response to the fact that the fluctuation width of the fluctuation of any one of the vehicle-to-vehicle distance, the relative speed, and the TTC has become equal to or greater than a predetermined threshold value.

Figure 3:
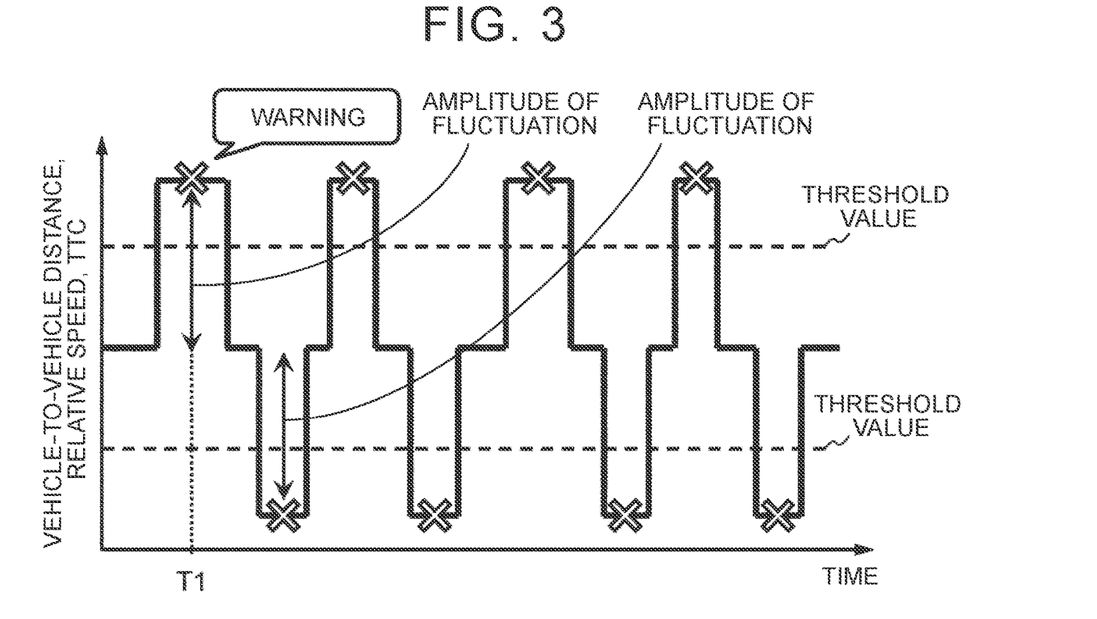
FIG. 3 is a graph showing an example of a case where the control device according to the present embodiment executes a process of issuing a warning to a driver.

FIG. 3 is a graph showing an example in which the control device according to the present embodiment executes a process of giving a warning to a driver. The graph shown in FIG. 3 is similar to the graph shown in FIG. 2. In the example shown in FIG. 3, the control device according to the present embodiment gives a warning to the driver at a time T1 when it is determined that the fluctuation width of the fluctuation is equal to or greater than the threshold value. However, the threshold value for the increase of the physical quantity and the threshold value for the decrease of the physical quantity may be provided so as to be different from each other. In addition, different threshold values may be provided for the respective physical quantities.

Here, the warning to the driver may be suitably adopted depending on the configuration of the vehicle. For example, a warning may be given to the driver by giving a specific display on the display or by giving a specific sound from a speaker, or when the vehicle is an automatic driving vehicle, a warning may be given by giving a request for hands-on or a request for transfer of driving authority to the driver. Alternatively, a warning may be given by a combination of these.

The warning to the driver may be continuously performed while the fluctuation width of the fluctuation is equal to or greater than a predetermined threshold value. For example, a specific display is performed on the display in response to the fluctuation width becoming equal to or greater than a predetermined threshold value, and the display is continued until a period in which the fluctuation width is less than the predetermined threshold value continues for a predetermined time or longer.

By performing the process of performing a warning to the driver in this manner, the vehicle-to-vehicle distance, relative speed, or any one physical quantity of TTC is greatly fluctuated, there is a possibility that the safety is impaired, it is possible to prompt the driver to actively drive operation. As a result, safety can be ensured when the deceleration process is performed on the preceding vehicle 2, which lights the hazard lamp.

The fluctuation width of the fluctuation is calculated by, for example, a value of a physical quantity which increases or decreases at a predetermined change rate or more. The threshold value is given by, for example, a predetermined positive and negative margin with respect to a physical quantity that increases or decreases below a predetermined rate of change.

That is, in this case, when the physical quantity increases or decreases below the predetermined change rate, the threshold value also increases or decreases in accordance with the increase or decrease of the physical quantity. When the physical quantity increases or decreases at a predetermined change rate or more, it is determined whether or not the physical quantity exceeds the threshold value without changing the threshold value. Here, the predetermined rate of change can be given by the rate of change of the physical quantity, which is assumed when the upper limit and the preceding vehicle 2 of the rate of change of the physical quantity, which is usually assumed to light the hazard lamp, it may be optimally given experimentally.

Further, the control device according to the present embodiment is configured so as not to execute the deceleration processing while the fluctuation width of the fluctuation of any one of the vehicle-to-vehicle distance, the relative speed, and the TTC is equal to or larger than a predetermined threshold value.

As a result, it is possible to suppress the execution of the deceleration process when the vehicle-to-vehicle distance, the relative speed, or the TTC fluctuates greatly and there is a fear that the judgment of the control may be erroneous. As a result, safety can be further ensured when the deceleration process is performed on the preceding vehicle 2, which lights the hazard lamp.

Figure 4:
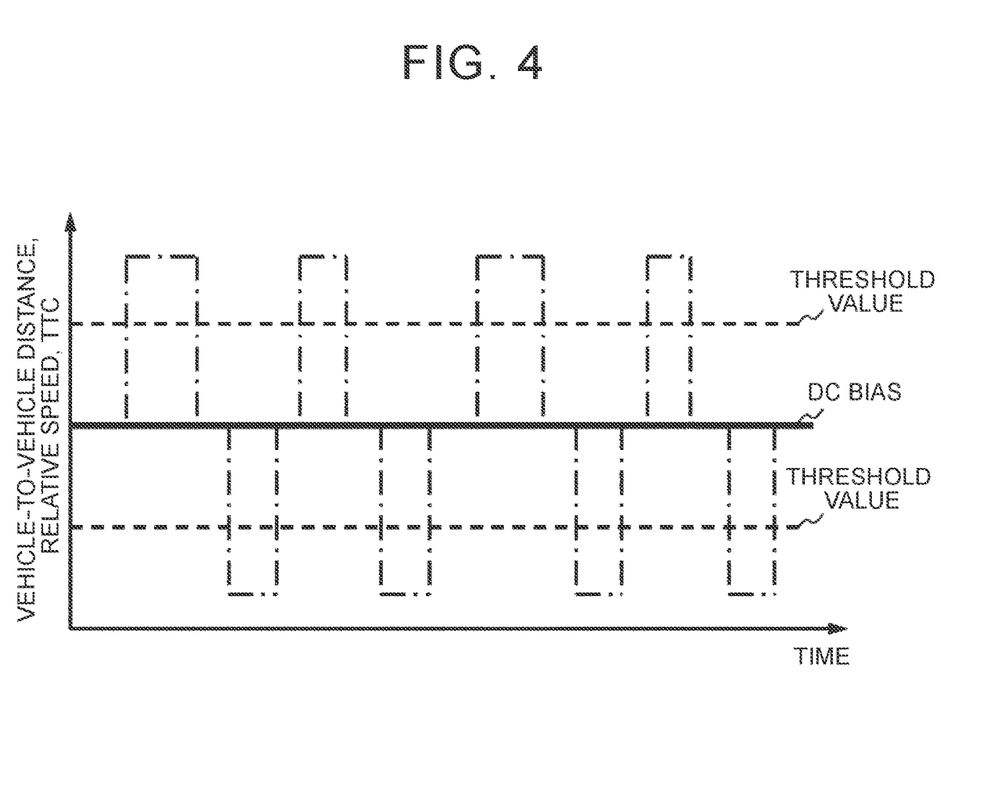
FIG. 4 is a graph showing an example of a physical quantity and its DC bias in which the variation periodic.

On the other hand, the control device according to the present embodiment is configured to execute the deceleration processing by using the DC bias of the periodic fluctuation as a representative value of any one of the physical quantities when the fluctuation width of the physical quantity of any one of the vehicle-to-vehicle distance, the relative speed, and the TTC is periodically fluctuated even if the fluctuation width of the physical quantity is equal to or larger than a predetermined threshold value. FIG. 4 shows an example of a physical quantity fluctuation is periodic (one-dot chain line) and its DC bias (solid line).

Thus, it is possible to expand the situation capable of performing deceleration processing while reducing the influence of large fluctuations in the physical quantity. In addition, improvement of control performance and improvement of safety can be expected.

2. Configuration

Hereinafter, a schematic configuration of a vehicle system to which the control device according to the present embodiment is applied will be described.

2-1. Vehicle System

Figure 5:
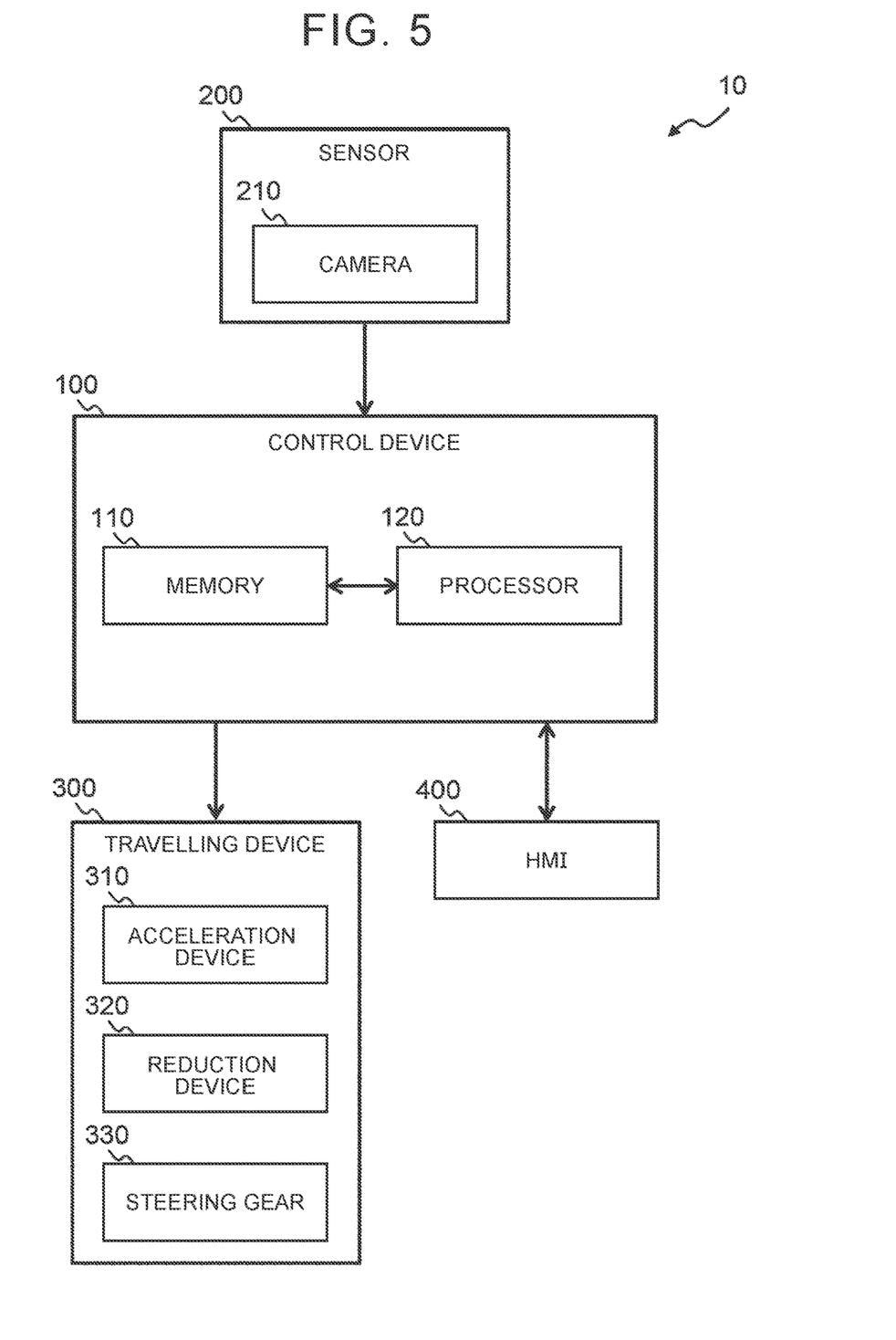
FIG. 5 is a block diagram showing a schematic configuration of a vehicle system to which the control device according to the present embodiment is applied.

FIG. 5 is a block diagram showing a schematic configuration of a vehicle system 10 to which the control device 100 according to the present embodiment is applied. The vehicle system 10 includes a control device 100, a sensor 200, a traveling device 300, and a HMI 400.

The control device 100 is configured to be able to communicate with the sensor 200, the traveling device 300, and HMI 400 to each other. Typically, it is electrically connected by a wiring harness. However, other configurations may be used. For example, it may be configured to be able to communicate with each other wirelessly.

Sensor 200 detects information relating to the driving environment of the vehicle 1, and outputs the detection information. Detection information output by the sensor 200 is transmitted to the control device 100. The sensor 200 includes at least a camera 210. Camera 210 images the environment around the vehicle 1, and outputs an image 212 captured as detection information. At least, the camera 210 images the front of the vehicle 1.

Camera 210 may further output information obtained by image recognition or the like from the captured image 212 as detection information. For example, the camera 210 may output white line information, the size of a surrounding target object, and the like as detection information. In this case, the camera 210 includes a processor for executing processing such as image recognition.

The sensor 200 may include other devices. Typically, the sensor 200 includes a sensor for detecting information about the running state of the vehicle 1 and a sensor for detecting information about the surrounding environment of the vehicle 1.

As sensors for detecting information on the surrounding environment of the vehicle 1, a wheel speed sensor for detecting the vehicle speed of the vehicle 1, a G sensor for detecting the acceleration of the vehicle 1, a gyro sensor for detecting the angular velocity of the vehicle 1, and the like are exemplified. As the sensor for detecting the information of the surrounding environment of the vehicle 1, in addition to the camera 210, millimeter-wave radar, LIDAR (Light Detection And Ranging), and the like are exemplified.

The control device 100 executes the processing according to the control of the vehicle 1 based on the information to be acquired, and outputs a control signal. The control device 100 is a computer comprising at least one memory 110 and at least one processor 120. Typically, the control device 100 is one of electronic control units (ECUs) provided in the vehicle 1. However, the control system may be configured by a plurality of ECUs. Alternatively, the control device 100 may be a device external to the vehicle 1. For example, it may be a server configured on a communication network (e.g., the Internet) to which the vehicle 1 can be connected.

Memory 110 stores various data and programs executable by processor 120. Examples of the memory 110 include a volatile memory, a non-volatile memory, a hard disk drive (HDD), and a solid state drive (SSD), and a storage medium. The information acquired by the control device 100 is stored in the memory 110 as data. Here, the control device 100 may store time-series data for a predetermined period of time as data in the memory 110 with respect to the information to be acquired. For example, as the time-series data of the image 212 acquired from the camera 210, a moving image in the past for a predetermined period may be stored in the memory 110 as data.

The processor 120 reads data and programs from the memory 110 and performs processing according to the program based on the data. In the control device 100 according to the present embodiment, the processing executed by the processor 120 according to the program includes the deceleration processing. The processor 120 also executes a process of estimating the vehicle-to-vehicle distance and relative speed from the image 212 with respect to the deceleration process to the preceding vehicle 2, a process of calculating the TTC from them, and the like. Processing performed by the processor 120 with respect to the deceleration processing will be described later.

The control device 100 stores the results of the processing performed by the processor 120 as data in the memory 110. In particular, the control device 100 stores the estimated vehicle-to-vehicle distance, the relative speed, and the calculated time-series data of the predetermined period of the TTC in the memory 110 as data.

The information the control device 100 acquires includes detection information the sensor 200 outputs. In particular, an image 212 that the camera 210 captures is included. The control device 100 may be configured to be able to acquire information from other devices not shown in FIG. 5. For example, it may be configured such that map information and information on the position of the vehicle 1 on the map can be acquired via the communication device.

The control signal output by the control device 100 includes a signal for operating the traveling device 300 and a signal for operating HMI 400. By traveling device 300 operates in accordance with the control signal, the control of the traveling of the vehicle 1 by the control device 100 is realized. Further, HMI 400 operates according to the control signal, with respect to the control of the vehicle 1 by the control device 100, notification to the driver is realized.

Traveling device 300 is a device for realizing an operation according to the traveling of the vehicle 1. Traveling device 300 includes an acceleration device 310, a reduction device 320, and a steering device 330.

The acceleration device 310 is a device for realizing the operation according to the acceleration of the vehicle 1. The acceleration device 310 includes, for example, an actuator for driving the power device (internal combustion engine, an electric motor, etc.), and an ECU for controlling the operation of the actuator. The acceleration device 310 operates in accordance with a control signal acquired from the control device 100, the control of the acceleration of the vehicle 1 by the control device 100 is realized.

The speed reduction device 320 is a device for realizing an operation according to the deceleration of the vehicle 1. The reduction device 320 is composed of, for example, an actuator for driving the brake mechanism (disc brake, parking brake, etc.), and an ECU for controlling the operation of the actuator. By decelerating device 320 operates in accordance with a control signal acquired from the control device 100, control relating to deceleration of the vehicle 1 by the control device 100 is realized. In particular, the deceleration of the vehicle 1 by the deceleration process is realized.

The steering device 330 is a device that realizes an operation related to steering of the vehicle 1. The steering device 330 includes, for example, an actuator for driving the steering mechanism and an ECU for controlling the operation of the actuator. The steering device 330 operates according to a control signal acquired from the control device 100, thereby realizing control related to steering of the vehicle 1 by the control device 100.

HMI 400 shows a device with HMI-functionality. HMI 400 receives operations by a driver and outputs various types of information, such as on/off of control functions and adjusting control amounts, to the control device 100. In addition, HMI 400 operates in accordance with control signals acquired from the control device 100 to notify various pieces of process information related to the control device 100, such as displays and sounds of the process information. In particular, the operation of HMI 400 in accordance with the control signal provides an alert to the driver with respect to the deceleration process. Examples of HMI 400 include switches, displays, speakers, and the like.

3. Control Method

Figure 6:
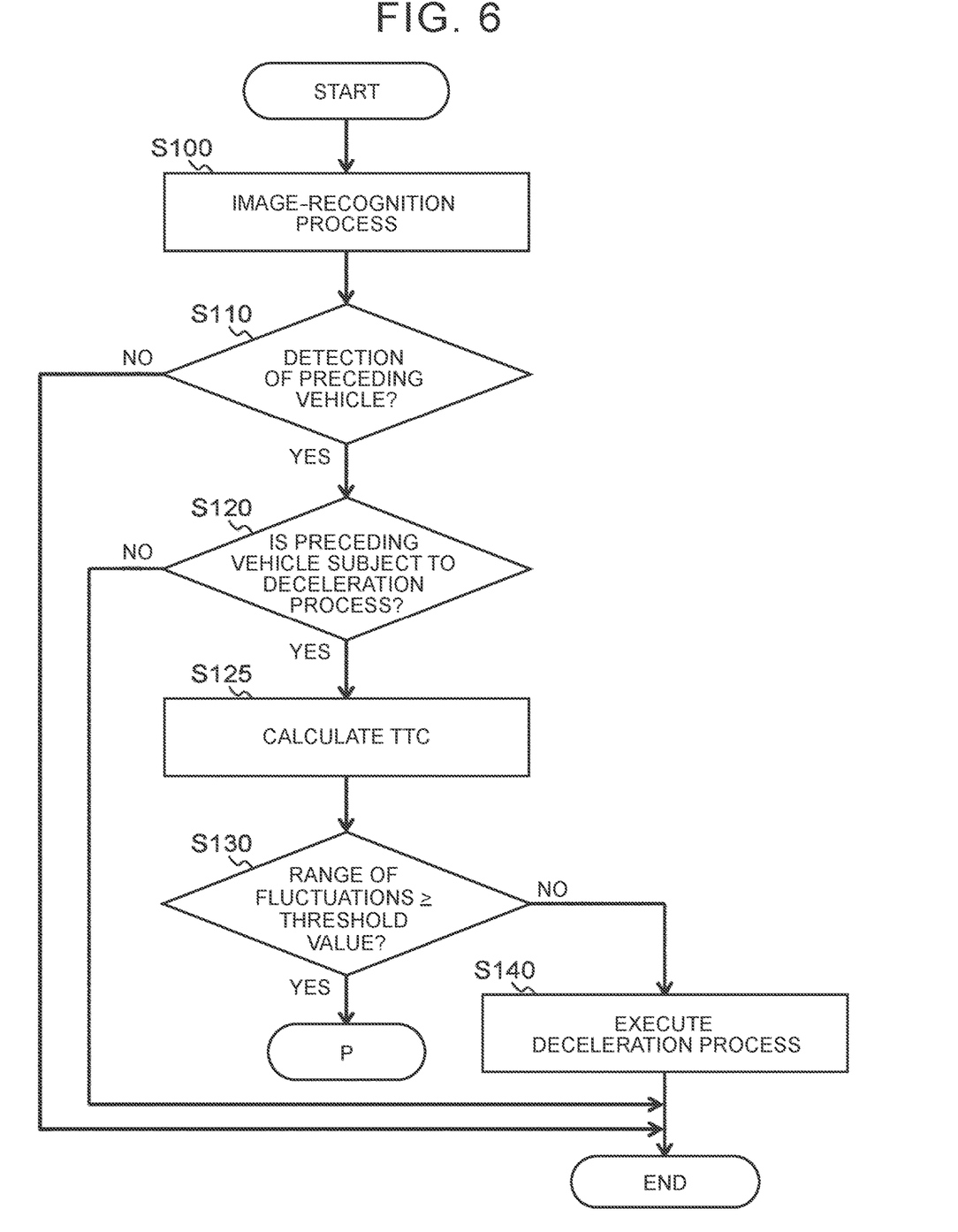
FIG. 6 is a flowchart showing a process that a processor executes with respect to a deceleration process, in the control device according to the present embodiment.
Figure 7:
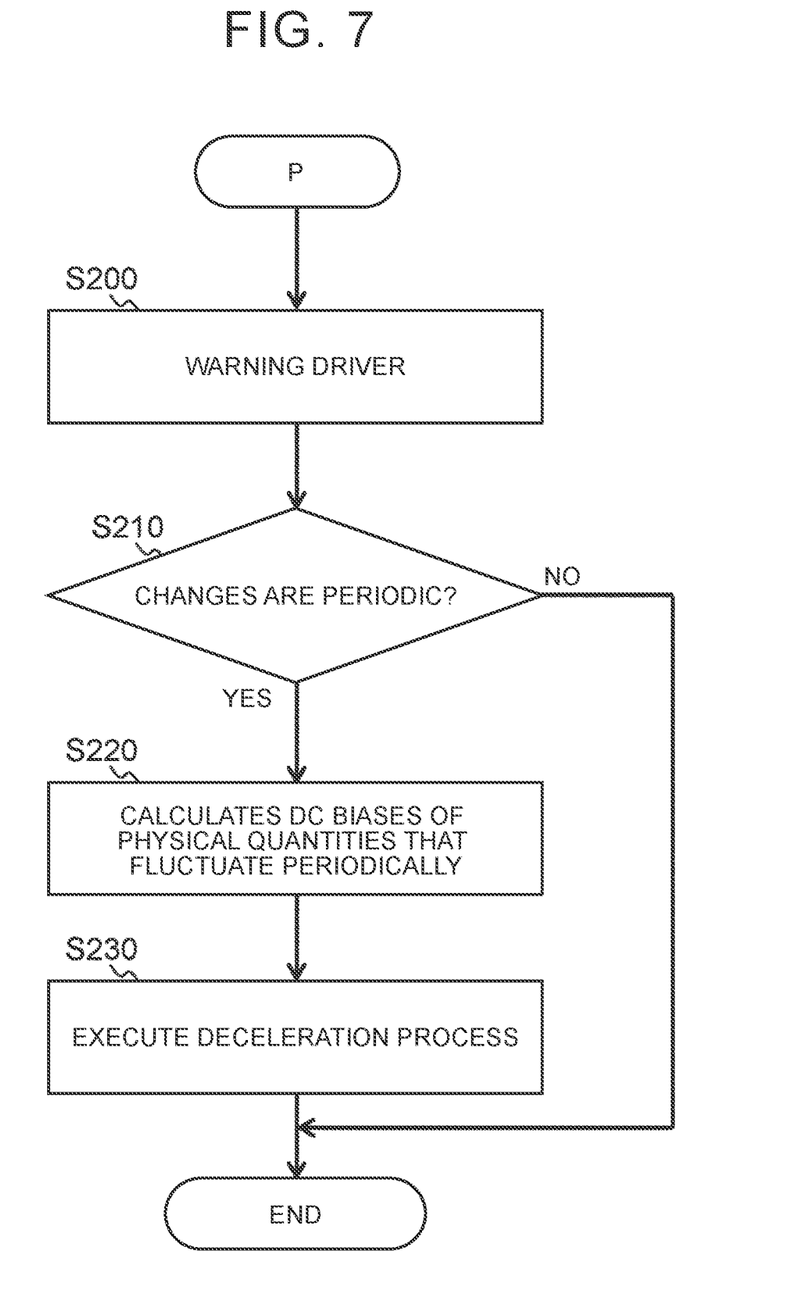
FIG. 7 is a flowchart showing a process that the processor executes with respect to the deceleration process, in the control device according to the present embodiment.

Hereinafter, in the control device 100 according to the present embodiment, a process executed by the processor 120 with respect to the deceleration process, and further, a control method realized by the control device 100 according to the present embodiment will be described. FIGS. 6 and 7 are flowcharts showing processing executed by the processor 120 with respect to the deceleration processing in the control device 100 according to the present embodiment.

Here, P shown in FIGS. 6 and 7 corresponds between FIGS. 6 and 7, and FIGS. 6 and 7 show one flowchart. The processes shown in FIGS. 6 and 7 are executed at predetermined intervals.

In step S100, the processor 120 performs an image recognizing process on the image 212 acquired from the cameras 210. Thus, the processor 120 detects the preceding vehicle 2 and estimates the vehicle-to-vehicle distance and relative speed with the preceding vehicle 2. The algorithm of the image recognition processing may employ any suitable known technique.

After step S100, the process proceeds to step S110.

In step S110, the processor 120 determines whether or not the preceding vehicle 2 has been detected. If the preceding vehicle 2 has been detected (step S110; YES), the process proceeds to step S120. If the preceding vehicle 2 is not detected (Step S110; No), the current process ends without executing the deceleration process.

In step S120, the processor 120 determines whether or not the preceding vehicle 2 is a target of the deceleration process. For example, when the preceding vehicle 2 is traveling in the same lane as the own vehicle, it is determined that the preceding vehicle 2 is subject to the deceleration process, and when the preceding vehicle 2 is not traveling in the same lane as the own vehicle, it is determined that the preceding vehicle 2 is not subject to the deceleration process. The determination of whether or not the preceding vehicle 2 is to be subjected to deceleration processing may be performed based on information acquired by the control device 100 (e.g., detected information acquired from the sensor 200), or may be performed based on information obtained by image-recognition processing (step S100). Therefore, the processor 120, in the image recognition process (step S100), may be configured to further acquire white line information or the like.

When the preceding vehicle 2 is to be subjected to the deceleration process (step S120; YES), the process proceeds to step S125. When the preceding vehicle 2 is not the object of the deceleration process (step S120; No), the deceleration process is not executed and the present process ends.

In step S125, the processor 120 calculates TTCs from the vehicle-to-vehicle distance and relative speed estimated in step S100. Typically, it is calculated by vehicle-to-vehicle distance/relative speed.

After step S125, the process proceeds to step S130.

In step S130, the processor 120 determines whether or not the fluctuation widths of the fluctuations of any one of the vehicle-to-vehicle distances and the relative speeds estimated in step S100 or the physical quantities of the TTCs calculated in step S125 are equal to or larger than predetermined threshold values.

When the fluctuation width of the fluctuation of any one of the vehicle-to-vehicle distances, the relative speeds, and the TTCs is equal to or greater than a predetermined threshold value (step S130; YES), the process proceeds to step S200. When the fluctuation widths of the variations of the physical quantities of the vehicle-to-vehicle distances, the relative speeds, and the TTCs are less than the predetermined threshold values (step S130; No), the process proceeds to step S140.

In step S140, the processor 120 performs a deceleration process based on the vehicle-to-vehicle distance and relative velocity estimated in step S100 and the TTCs calculated in step S100. After S140 of steps, the present process ends.

In a step S200, the processor 120 performs a process for alerting the driver. For example, a control signal for performing a specific display on the display is generated. Alternatively, a control signal for a hands-on request or a request for transfer of driving authority is generated.

After step S200, the process proceeds to step S210.

In step S210, the processor 120 determines whether or not the fluctuation is periodic with respect to the physical quantity whose fluctuation width is equal to or larger than a predetermined threshold value. For example, based on the time-series data stored in the memory 110, it is determined that the fluctuation is periodic in response to the fact that the determination that the fluctuation width is equal to or greater than the threshold value (the cross mark in FIG. 3) has been performed N times for a predetermined time S seconds, which has been continuously observed K times for a predetermined number of times.

If the variation is periodic (step S210; yes), the process proceeds to step S220. When the variation is not periodic (step S210; No), the present processing is terminated without executing the deceleration processing. That is, when the fluctuation width of the fluctuation of any one of the physical quantities is equal to or greater than the threshold value, the deceleration processing is not executed unless the fluctuation is periodic.

In step S220, the processor 120 calculates DC biases for periodically varying physical quantities. For example, it calculates the frequency of the physical quantity that fluctuates periodically, and calculates a DC bias by applying a filter so as to remove the calculated frequency.

After step S220, the process proceeds to step S230.

In step S230, the processor 120 executes a deceleration process. Here, the physical quantity that varies periodically represents the DC bias calculated in the stepped S220. For physical quantities where the swing of the variation is less than the threshold value, the estimated vehicle-to-vehicle distance and relative velocity in the step S100, or TTCs calculated in the step S125, may be employed.

After S230 of steps, the present process ends.

It should be noted that S100 of steps may be executed by the cameras 210. In other words, the control device 100 may be configured to acquire the information of detection of the preceding vehicle 2 from the camera 210 and the vehicleto-vehicle distance and relative speed with the preceding vehicle 2 estimated from the image 212 as the detection information.

The process relating to the step S125 may be configured to be executed immediately after the step S100.

4. Effect

As described above, according to the control device 100 and the control method according to the present embodiment, the process of giving a warning to the driver is executed in response to the fact that the fluctuation width of the fluctuation of any one of the vehicle-to-vehicle distance, the relative speed, and the TTC has become equal to or greater than a predetermined threshold value. Thus, the vehicle-to-vehicle distance, the relative speed, or if there is a possibility that the safety is impaired is greatly fluctuated any one physical quantity of TTC, it is possible to prompt the driver to actively drive operation. As a result, safety can be ensured when the deceleration process is performed on the preceding vehicle 2 that lights the hazard lamp.

Further, according to the control device 100 and the control method of the present embodiment, the deceleration processing is not executed when the fluctuation is not periodic while the fluctuation width of the fluctuation of any one of the vehicle-to-vehicle distance, the relative speed, and the TTC is equal to or greater than a predetermined threshold value. As a result, it is possible to suppress the execution of the deceleration process when the vehicle-to-vehicle distance, the relative speed, or the TTC fluctuates greatly and there is a fear that the judgment of the control may be erroneous. As a result, safety can be further ensured when the deceleration process is performed on the preceding vehicle 2 that lights the hazard lamp.

Further, according to the control device 100 and the control method according to the present embodiment, even if the fluctuation width of the fluctuation of any one of the vehicle-to-vehicle distance, the relative speed, and the TTC is equal to or greater than a predetermined threshold value, in the case of periodically fluctuating, the deceleration processing is executed by using the periodic variation DC bias as a representative value of any one of the physical quantities. Thus, it is possible to expand the situation capable of performing deceleration processing while reducing the influence of large fluctuations in the physical quantity. In addition, improvement of control performance and improvement of safety can be expected.

5. Modification

The control device 100 according to the present embodiment may adopt a modified mode as described below.

The processor 120 may also be configured to execute the deceleration processing using the periodic variation DC bias as a representative value when the fluctuation width of the variation is less than the threshold value in the case of periodic variation. In other words, in this case, the processor 120 executes the deceleration processing as a representative value of the physical quantity in which the DC bias periodically fluctuates, regardless of whether or not the fluctuation width of the fluctuation is equal to or greater than the threshold value.

This makes it possible to reduce the influence of the fluctuation of the physical quantity. In addition, improvement of control performance and improvement of safety can be further expected.

What is claimed is:

1. A control device that controls traveling of a vehicle, the control device comprising a processor configured to:

acquire an image captured by a camera provided in the vehicle and estimating a vehicle-to-vehicle distance and a relative speed with respect to a preceding vehicle based on the image;

calculate a time to collision with respect to the preceding vehicle from the vehicle-to-vehicle distance and the relative speed;

determine whether fluctuation widths of fluctuations of any one of the vehicle-to-vehicle distance, the relative speed, and the time to collision are equal to or greater than predetermined threshold values;

upon determination that the fluctuation widths of the fluctuations of any one of the vehicle-to-vehicle distance, the relative speed, and the time to collision are equal to or greater than the predetermined threshold values, warn a driver of the vehicle and determine whether the fluctuations of the vehicle-to-vehicle distance, the relative speed, or the time to collision having the fluctuation width equal to or greater than the predetermined threshold value is periodic; and upon determination that the fluctuations are periodic, determine a mean value for the periodic vehicle-to-vehicle distance, relative speed, or time to collision, and decelerate the vehicle based on the vehicle-to-vehicle distance, the relative speed, the time to collision, and the mean value.

2. The control device according to claim 1, wherein the processor is configured to decelerate the vehicle based on the vehicle-to-vehicle distance, the relative speed, and the time to collision upon determination that the fluctuation widths of the fluctuations of any one of the vehicle-to-vehicle distance, the relative speed, and the time to collision are not equal to or greater than the predetermined threshold values.

3. A control method that controls traveling of a vehicle, the control method comprising:

acquiring an image captured by a camera provided in the vehicle and estimating a vehicle-to-vehicle distance and a relative speed with respect to a preceding vehicle based on the image;

calculating a time to collision with respect to the preceding vehicle from the vehicle-to-vehicle distance and the relative speed;

determining whether fluctuation widths of fluctuations of any one of the vehicle-to-vehicle distance, the relative speed, and the time to collision are equal to or greater than predetermined threshold values;

upon determination that the fluctuation widths of the fluctuations of any one of the vehicle-to-vehicle distance, the relative speed, and the time to collision are equal to or greater than the predetermined threshold values, warning a driver of the vehicle and determining whether the fluctuations of the vehicle-to-vehicle distance, the relative speed, or the time to collision having the fluctuation width equal to or greater than the predetermined threshold value is periodic and;

upon determination that the fluctuations are periodic, determining a mean value for the periodic vehicle-to-vehicle distance, relative speed, or time to collision, and decelerating the vehicle based on the vehicle-to-vehicle distance, the relative speed, the time to collision, and the mean value.

4. A non-transitory storage medium that stores a program that causes a computer to execute the control method according to claim 3.

5. The control method according to claim 3, further comprising decelerating the vehicle based on the vehicleto-vehicle distance, the relative speed, and the time to collision upon determination that the fluctuation widths of the fluctuations are any one of the vehicle-to-vehicle distance, the relative speed, and the time to collision are not equal to or greater than the predetermined threshold values.

* * * * *